United States Patent
Yang

(10) Patent No.: US 10,318,610 B2
(45) Date of Patent: Jun. 11, 2019

(54) DISPLAY METHOD AND ELECTRONIC DEVICE

(71) Applicant: Lenovo (Beijing) Co., Ltd., Beijing (CN)

(72) Inventor: Chunlong Yang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 470 days.

(21) Appl. No.: 14/670,840

(22) Filed: Mar. 27, 2015

(65) Prior Publication Data

US 2016/0110328 A1 Apr. 21, 2016

(30) Foreign Application Priority Data

Oct. 15, 2014 (CN) .......................... 2014 1 0545196

(51) Int. Cl.
*G06F 3/0481* (2013.01)
*G06F 11/32* (2006.01)
*H04N 21/472* (2011.01)
*G06F 17/21* (2006.01)

(52) U.S. Cl.
CPC ........ *G06F 17/211* (2013.01); *G06F 3/04817* (2013.01)

(58) Field of Classification Search
None
See application file for complete search history.

(56) References Cited

U.S. PATENT DOCUMENTS

| 6,101,506 | A * | 8/2000 | Ukai | G06F 3/0482 |
| | | | | 707/679 |
| 8,793,575 | B1 * | 7/2014 | Lattyak | G09B 5/062 |
| | | | | 715/273 |
| 2005/0251758 | A1 * | 11/2005 | Cummins | G06F 9/4443 |
| | | | | 715/838 |
| 2006/0101053 | A1 * | 5/2006 | Proctor | G06F 9/44505 |
| 2006/0195426 | A1 | 8/2006 | Ishii et al. | |
| 2008/0123954 | A1 * | 5/2008 | Ekstrand | G11B 27/28 |
| | | | | 382/173 |
| 2011/0125765 | A1 * | 5/2011 | Tuli | G06F 17/30035 |
| | | | | 707/751 |
| 2014/0095999 | A1 * | 4/2014 | Lehto | H04N 21/4751 |
| | | | | 715/716 |

FOREIGN PATENT DOCUMENTS

| CN | 103442299 A | 12/2013 |
| CN | 103905887 A | 7/2014 |
| CN | 104090911 A | 10/2014 |

OTHER PUBLICATIONS

First Chinese Office Action regarding Application No. 201410545196.2 dated Jan. 25, 2017. English translation provided by Unitalen Attorneys at Law.

* cited by examiner

*Primary Examiner* — Nhat Huy T Nguyen
(74) *Attorney, Agent, or Firm* — Harness, Dickey & Pierce, P.L.C.

(57) ABSTRACT

A display method and an electronic device are provided. The method includes: displaying a display interface including at least one object; obtaining progress information of at least one first object of the at least one object, where the progress information indicates a content position of the at least one first object that was last output; and displaying the progress information of the at least one first object in the display interface.

5 Claims, 3 Drawing Sheets

DISPLAY METHOD AND ELECTRONIC DEVICE

The present application claims the priority to Chinese Patent Applications No. 201410545196.2, titled "DISPLAY METHOD AND ELECTRONIC DEVICE", filed with the Chinese State Intellectual Property Office on Oct. 15, 2014, which is incorporated herein by reference in its entirety.

FIELD

The disclosure relates to the field of data processing, and in particular to a display method and an electronic device.

BACKGROUND

An electronic device generally has a function for playing a file. For example, a user can play a video file, an audio file, a document or a picture on the electronic device.

As amount of information and storage capacity of the electronic device increase continuously, the user stores more and more files in the electronic device.

Now, the user determines whether a file stored in the electronic device is played from memory. If the user can not remember clearly whether a file is displayed, the user has to open the file to see whether the file is watched, and if the file has been watched, the user has to open another file until the file which has not been completely watched is found.

Therefore, playing of multiples files may be tried by the electronic device due to unclear memory of the user, which occupies data processing resource of the electronic device and increases energy consumption of the electronic device.

SUMMARY

A display method includes: displaying a display interface comprising at least one object; obtaining progress information of at least one first object of the at least one object, wherein the progress information indicates a content position of the at least one first object that was last output; and displaying the progress information of the at least one first object in the display interface.

An electronic device includes: an interface display unit, configured to display a display interface comprising at least one object; a progress information obtaining unit, configured to obtain progress information of at least one first object of the at least one object, wherein the progress information indicates a content position of the at least one first object that was last output; and a progress information display unit, configured to display the progress information of the at least one first object in the display interface.

BRIEF DESCRIPTION OF THE DRAWINGS

In order to illustrate the technical solutions in the embodiments of the disclosure more clearly, the drawings for the description of the embodiments will be introduced simply below. Apparently, the drawings described below are only some embodiments of the disclosure, and other drawings may be obtained based on these drawings by those skilled in the art without any creative work.

DETAILED DESCRIPTION

Hereinafter the technical solutions of the embodiments of the disclosure will be described clearly in conjunction with the drawings of the embodiments of the disclosure. Apparently, the described embodiments are only some embodiments of the disclosure. All other embodiments obtained based on these embodiments by those skilled in the art without any creative work fall within the scope of protection of the disclosure.

In order to make the objects, features and advantages of the disclosure more apparent, the disclosure will be described in detail below in conjunction with the drawings and embodiments.

Figure 1:
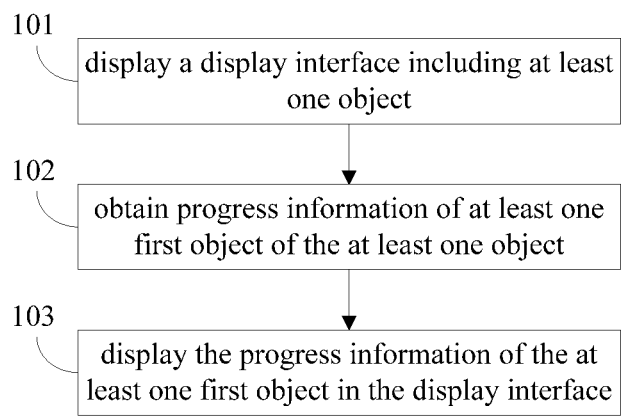
FIG. 1 is a flowchart of a display method according to a first embodiment of the disclosure.

FIG. 1 is a flowchart of a display method according to a first embodiment of the disclosure. As shown in FIG. 1, the method includes step 101 to step 103.

In step 101, a display interface including at least one object is displayed.

The display interface may be a display interface of a first application. For example, the first application may be an application program named explorer.exe for displaying a folder. The first application may also be other applications. It should be noted that, the first application may also be an operating system of an electronic device. For example, the operating system may display one or more objects on the desktop.

The at least one object may be a file of any type displayed in the display interface. For example, the at least one object may be a file of any type displayed in a display interface of a folder. It should be noted that the object in the embodiment of the disclosure may be also a subfolder displayed in the display interface of the folder.

In step 102, progress information of at least one first object of the at least one object is obtained, where the progress information indicates a content position of the at least one first object that was last output.

The first object may be all objects of the at least one object, or may be some objects of the at least one object, or may be one object of the at least one object.

The first object may be output using a second application. The second application may be the same as or different from the first application. For example, the second application being the same as the first application may include that: the first application is an application program for displaying a folder, and the second application is also an application program for displaying a folder. The second application being different from the first application may include that: the first application is an application program for displaying a folder, and the second application is a media file player.

In a case that the first application is different from the second application, the second application is configured to output the first object. For example, in a case that the first object is a video file, the second application is a video player, and in a case that the first object is a text file, the second application is a text reading program, while the first application may be an application program for displaying a folder. Therefore, the first application and the second application different from the first application are in different levels. The progress information of the at least one first object may be displayed in the display interface of the first application before the content of the first object is presented using the second application, such that a user can know the progress information of the first object before outputting the first object using the second application.

The number of the first object may be one or more.

For example, the first object is a video file. Practically, the first object may be also an audio file. A case that the first object is a video file is taken as an example in the embodiment. The type of the first object is not limited herein. In a case that the number of the first object is one, the progress information may indicate a time content position of the video file that was last output by a player in a whole content of the video file. For example, in a case that a video file is played to the 30th minute last time, the progress information may indicate that the video file is played to the 30th minute last time. The progress information may be also presented by a proportion. For example, in a case that a video file is played to the 30th minute last time and a total duration of the video file is 60 minutes, the progress information may be presented as 50%, which indicates that the duration for playing the video file last time accounts for 50% of the total duration of the video file.

In a case that the first object is a text document, the progress information may indicate a spatial content position of the text document that was last presented in a whole content of the text document. For example, in a case that the first object is a text document having a total of 100 pages and the text document is browsed to the 50th page last time, the progress information may indicate that the text document is browsed to the 50th page last time. The progress information may be also presented by a proportion. For example, in a case that a text document has a total of 200 pages and the text document is browsed to the 50th page last time, the progress information may be presented as 25%, which indicates that the number of pages of the text document that have been browsed last time accounts for 25% of the total number of pages of the text document.

The first object may be a file of any type. In a case that the number of the first object is two or more, the progress information may indicate a spatial position of an object that was last presented in the whole of the two or more first objects during outputting the two or more first objects in a first order. For example, in a case that there are totally ten files, the progress information may indicate which file is last browsed to in the first order.

In step 103, the progress information of the at least one first object is displayed in the display interface.

The progress information may be displayed in the display interface using the first application. It should be noted that the display method in the embodiment may be performed by a portion of the first application or by an independent application. In the embodiment of the disclosure, the independent application may be referred to as a third application.

The progress information may be obtained by the first application before the progress information is displayed in the display interface. Practically, the progress information may be obtained by the third application and then the progress information is sent from the third application to the first application; or the progress information may be obtained directly by the first application.

In the embodiment of the disclosure, the progress information of the at least one first object of the at least one object is obtained, where the progress information indicates a content position of the at least one first object that was last output in a whole content of the at least one first object, and the progress information of the at least one first object is displayed in the display interface. In this way, the progress information of a file can be displayed, and tentative playing of the file on the electronic device can be avoided or reduced, which reduces occupation of data processing resource of the electronic device and reduces energy consumption of the electronic device.

In another aspect, the progress information of the at least one first object may be displayed in the display interface of the first application before the content of the first object is presented using the second application, such that the user can know the progress information of the first object before outputting the first object using the second application. In this way, tentative playing of the file by the user is decreased, tentative playing of the file on the electronic device is avoided or reduced, the time for the tentative playing is saved, the time for learning the progress information of the file by the user is shortened and thus the efficiency for learning the progress information of the file by the user is improved.

Figure 2:
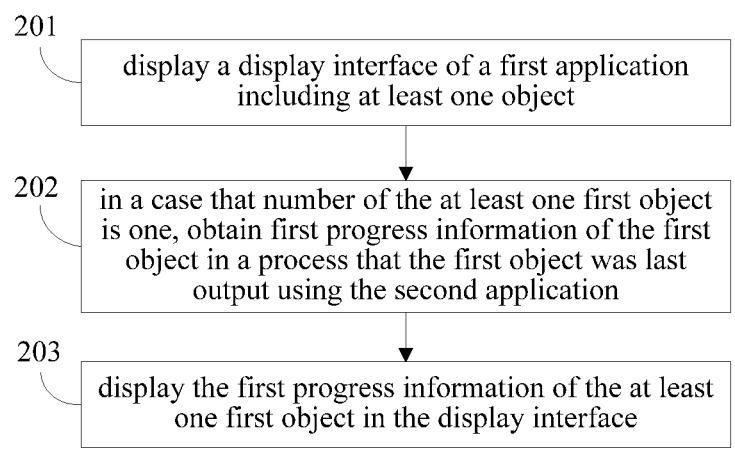
FIG. 2 is a flowchart of a display method according to a second embodiment of the disclosure.

FIG. 2 is a flowchart of a display method according to a second embodiment of the disclosure. As shown in FIG. 2, the method includes step 201 to step 203.

In step 201, a display interface of a first application including at least one object is displayed. A second application can be started and a content of an object can be output by performing a trigger operation on the object in the display interface of the first application, and the second application is different from the first application.

In the embodiment, the first application may be an application for displaying a folder, and the second application may be an application for displaying an object of a type other than the folder. For example, in a case that the first object is a video file, the second application may be a video player; in a case that the first object is an audio file, the second application may be an audio player; in a case that the first object is a picture, the second application may be a picture browser; and in a case that the first object is a text, the second application may be a text browser.

In step 202, in a case that number of the at least one first object is one, first progress information of the first object in a process that the first object was last output using the second application is obtained.

The first progress information indicates a spatial content position of the first object that was last output in a whole content of the first object.

Alternatively, the first progress information indicates a time content position of the first object that was last output in a whole content of the first object.

The ways for presenting objects of different types are different.

Specifically, an object of a text type or an object of a picture type is generally presented in a spatial position order. For example, for a word document, the displayed page is the first page firstly and then the second page below the first page after the first page is browsed by a user. For a picture with a large size, the picture is generally presented from top to bottom or from left to right. Therefore, for the first object of the text type or the first object of the picture type, the first progress information indicates a spatial content position of the first object that was last presented in a whole content of the first object.

An object of an audio type or an object of a video type is generally output in a time order. For example, an audio file of an MP3 format is generally played according to a timeline, i.e., is played continuously from the first second, and a video file is played in the same manner. Therefore, for the first object of the audio type or the first object of the video type, the first progress information indicates a time content position of the first object that was last output in a whole content of the first object.

In step 203, the first progress information of the at least one first object is displayed in the display interface.

In the embodiment, the first progress information of the first object in a process that the first object was last output using the second application is obtained, where the first progress information indicates a spatial content position of the first object that was last output in a whole content of the first object, or a time content position of the first object that was last output in a whole content of the first object. In this way, displaying of the progress information of a single first object is achieved.

It should be noted that if the display interface includes multiple objects, the display method of the embodiment may be performed on each object separately. For example, in a case that a display interface of folder includes multiple video files, each video file is taken as the first object and first progress information of each video file is displayed separately.

In the embodiment of the disclosure, the display interface may include at least one object, and the object has at least identification information and the progress information. The identification information of the at least one first object is displayed in a first mode. The identification information indicates information of a name of the first object. The progress information of the at least one first object is displayed in a second mode, and the second mode is different from the first mode. For example, the identification information may be a file name of the first object, and generally the file name is displayed in a form of character. The progress information may be displayed in a second mode different from the character form. For example, the progress information may be displayed by graphics. For example, in a case that the browsed content of a video file accounts for 50% of a whole content of the video file, a progress bar is displayed, with 50% of the total length of the progress bar being displayed by a first color and the remaining portion of the progress bar being displayed by a second color.

Figure 3:
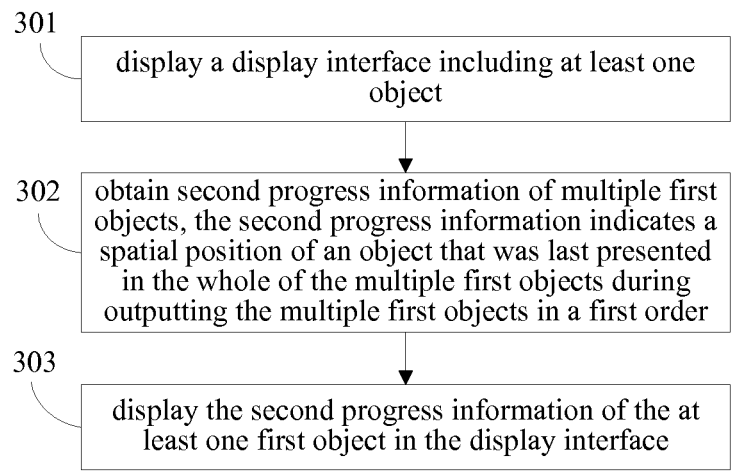
FIG. 3 is a flowchart of a display method according to a third embodiment of the disclosure.

FIG. 3 is a flowchart of a display method according to a third embodiment of the disclosure. As shown in FIG. 3, the method includes step 301 to step 303.

In step 301, a display interface including at least one object is displayed.

In step 302, second progress information of multiple first objects is obtained, where the second progress information indicates a spatial position of an object that was last presented in the whole of the multiple first objects during outputting the multiple first objects in a first order.

The first order is an arrangement order of the multiple first objects in the display interface, and the arrangement order is the same as an arrangement order in which the multiple first objects were last displayed in the display interface.

In the embodiment, the display interface may be, for example, a display interface of a folder or a desktop of an operating system. The display interface includes multiple first objects which are arranged in a certain order. For example, in the display interface of the folder, multiple files are arranged in an order of file names or in an order of access time. For another example, on a desktop of an operating system, multiple files are arranged in an order of file generation time or in an order set by dragging the multiple files by a user.

In the method of the embodiment, the arrangement order of the first objects in the display interface is the same as an arrangement order in which the first objects were last displayed in the display interface, and the multiple first objects are also output in the same arrangement order.

Once the above condition is met, progress information of the multiple first objects can be indicated by the spatial position of the object that was last presented in the whole of the multiple first objects.

For example, the display interface includes a total of ten files and the sixth file is browsed to in a first order last time, thereby progress information, which indicates that the sixth file of the ten files is browsed to in the first order, may be obtained.

In step 303, the second progress information of the at least one first object is displayed in the display interface.

In the embodiment, a mark may be added to the object that was last presented to indicate the progress information. For example, in a case that the progress information indicates that the sixth file of the ten files is browsed to in the first order, an asterisk may be added to the icon of the sixth file, as the progress information.

In the embodiment, the progress information may be also displayed in a graphical mode. For example, the display color of the object that was last presented is changed, to indicate that the object is the object that was last presented. Specifically, in a case that the progress information indicates that the sixth file of the ten files is browsed to in the first order, the icon of the sixth file is displayed in a yellow color, as the progress information.

In the embodiment, the spatial position of the object that was last presented in the whole of the multiple first objects during outputting the multiple first objects in the first order is obtained; the first order is an arrangement order of the first objects in the display interface; the arrangement order is the same as an arrangement order in which the first objects were last displayed in the display interface; and the progress information of the at least one first object is displayed in the display interface. In this way, displaying of progress information of multiple first objects can be achieved.

Figure 4:
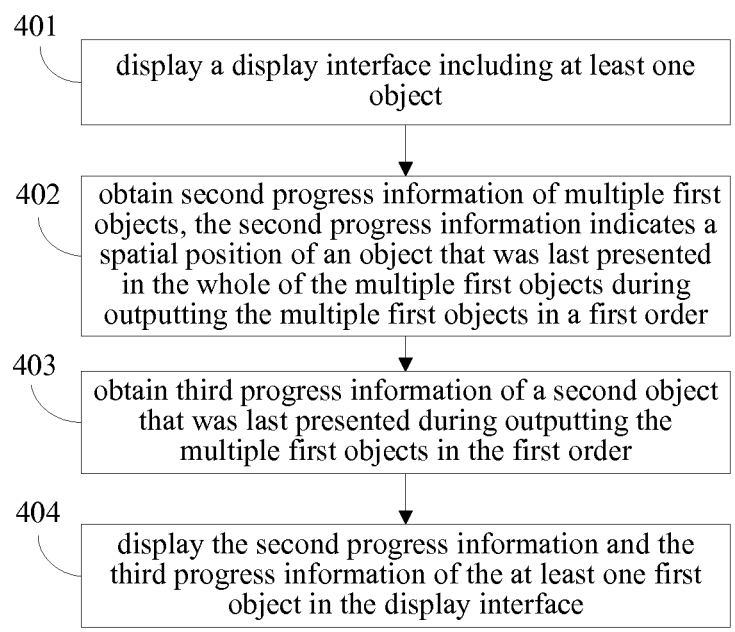
FIG. 4 is a flowchart of a display method according to a fourth embodiment of the disclosure.

FIG. 4 is a flowchart of a display method according to a fourth embodiment of the disclosure. As shown in FIG. 4, the method includes step 401 to step 404.

In step 401, a display interface of a first application including at least one object is displayed, where a second application can be started and a content of an object can be output by performing a trigger operation on the object in the display interface of the first application, and the second application is different from the first application.

In step 402, second progress information of multiple first objects is obtained, where the second progress information indicates a spatial position of an object that was last presented in the whole of the multiple first objects during outputting the multiple first objects in a first order.

The first order is an arrangement order of the first objects in the display interface, and the arrangement order is the same as an arrangement order in which the first objects were last displayed in the display interface.

In this step, progress information of multiple first objects can be displayed. That is, it can be determined that which first object is last browsed to during browsing the multiple first objects in the first order by a user.

In step 403, third progress information of a second object that was last presented during outputting the multiple first objects in the first order is obtained. The third progress information is progress information of the second object in a process that the second object was last output using the second application.

The third progress information indicates a spatial content position of the second object that was last output using the second application in a whole content of the second object.

Alternatively, the third progress information indicates a time content position of the second object that was last output using the second application in a whole content of the second object.

In this step, the third progress information of the second object of the multiple first objects may be obtained. The second object is an object that was last presented during outputting the multiple first objects in the first order. It should be noted that the second object may be the same as the first object that was last browsed during browsing the multiple first objects in the first order in step 402.

In this step, the third progress information of the second object may be obtained. For example, in a case that the second object is a file of a video type, the third progress information may indicate a duration during which the second object has been played by a video player last time.

In step 404, the second progress information and the third progress information of the at least one first object are displayed in the display interface.

In this step, the second progress information and the third progress information of the at least one first object may be displayed simultaneously. For example, in a case that a display interface of a folder includes eight files, the second progress information may indicate which file of the eight files is browsed to. It is assumed that the sixth file is browsed to and the sixth file is a video file, the third progress information may indicate a duration during which the content of the sixth file has been last played by the video player.

In the embodiment, by combining the method of the second embodiment and the method of the third embodiment together, besides displaying the progress information of multiple first objects, the progress information of a single object of the multiple first objects may be displayed.

It should be noted that, the display method according to any of the above embodiments of the disclosure may further include: before the progress information of at least one first object of the at least one object is obtained, obtaining type information of the at least object; and in a case that a type of the object indicated by the type information meets a preset condition, determining the object of the type as the first object, where the type of the object indicated by the type information meeting the preset condition indicates that an application for presenting an object of the type exists locally in the electronic device.

The type information of the object may indicate a type of the object. The type information may be obtained from name suffix of the object. An application for presenting an object of the type existing locally in the electronic device refers to that an application associated with an object of this type is installed in the electronic device locally. The application for presenting an object of this type is determined by default in the electronic device. For example, in a case that the object is a document with a name suffix doc, an application named Microsoft word is installed in the electronic device locally and an application associated with the document with the name suffix doc is determined as Microsoft word by default, the object of the doc type is an object whose type meets the preset condition.

An electronic device is further disclosed by the disclosure. The electronic device may be a mobile phone, a computer, a tablet computer or the like.

Figure 5:
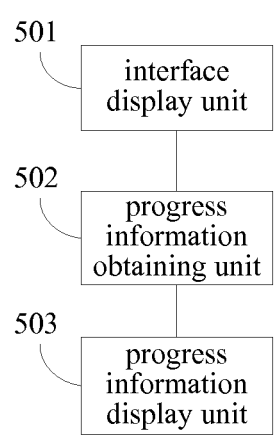
FIG. 5 is a structural diagram of an electronic device according to an embodiment of the disclosure.

FIG. 5 is a structural diagram of an electronic device according to an embodiment of the disclosure. As shown in FIG. 5, the electronic device includes an interface display unit 501, a progress information obtaining unit 502 and a progress information display unit 503.

The interface display unit 501 is configured to display a display interface including at least one object.

The display interface may be a display interface of a first application. For example, the first application may be an application program named explorer.exe for displaying a folder. The first application may be also other applications.

The at least one object may be a file of any type displayed in the display interface. For example, the at least one object may be a file of any type displayed in a display interface of a folder. It should be noted that the object described in the embodiment of the disclosure may be also a subfolder displayed in the display interface of the folder.

The progress information obtaining unit 502 is configured to obtain progress information of at least one first object of the at least one object, where the progress information indicates a content position of the at least one first object that was last output.

The first object may be all objects of the at least one object, or may be some objects of the at lest one object, or may be one object of the at least one object.

The first object may be output using a second application. The second application may be the same as or different from the first application. For example, the second application being the same as the first application may include that: the first application is an application program for displaying a folder, and the second application is also an application program for displaying a folder. The second application being different from the first application may include that: the first application is an application program for displaying a folder, and the second application is a media file player.

The number of the first object may be one or more.

For example, in a case that the first object is a video file and the number of the first object is one, the progress information may indicate a time content position of the video file that was last output by a player in a whole content of the video file. For example, in a case that a video file is played to the 30th minute last time, the progress information may indicate that the video file is played to the 30th minute last time.

In a case that the first object is a text document, the progress information may indicate a spatial content position of the first object that was last presented in a whole content of the first object. For example, in a case that the first object is a text document having a total of 100 pages and the text document is browsed to the 50th page last time, the progress information may indicate that the text document is browsed to the 50th page last time.

The first object may be a file of any type. In a case that the number of the first object is two or more, the progress information may indicate a spatial position of an object that was last presented in the whole of the multiple first objects during outputting the two or more first objects in a first order. For example, in a case that there are totally ten files, the progress information may indicate which file is last browsed to in the first order.

The progress information display unit 503 is configured to display the progress information of the at least one first object in the display interface.

The progress information may be displayed in the display interface using the first application. It should be noted that the display method in the embodiment may be performed by a portion of the first application or by an independent application. In the embodiment of the disclosure, the independent application may be referred to as a third application.

The progress information may be obtained by the first application before the progress information is displayed in the display interface. Practically, the progress information may be obtained by a third application and then the progress information is sent from the third application to the first application; or the progress information may be obtained directly by the first application.

In the embodiment, the progress information of at least one first object of the at least one object is obtained, where the progress information indicates a content position of the at least one first object that was last output in a whole content of the at least one first object, and the progress information of the at least one first object is displayed in the display interface. In this way, the progress information of a file can be displayed, and tentative playing of the file on the electronic device can be avoided or reduced, which reduces occupation of data processing resource of the electronic device and reduces energy consumption of the electronic device.

Optionally, the interface display unit 501 may include a first interface display subunit.

The first interface display subunit is configured to display a display interface of a first application including at least one object, where a second application is started and a content of an object is output by performing a trigger operation on the object in the display interface of the first application, and the first application is different from the second application.

The progress information obtaining unit may include a first progress information obtaining subunit.

The first progress information obtaining subunit is configured to, in a case that the number of the at least one first object is one, obtain first progress information of the first object in a process that the first object was last output using the second application.

The first progress information indicates a spatial content position of the first object that was last presented in a whole content of the first object.

Alternatively, the first progress information indicates a time content position of the first object that was last presented in a whole content of the first object.

Optionally, the progress information obtaining unit 502 may include a second progress information obtaining subunit.

The second progress information obtaining subunit is configured to, in a case that the number of the at least one first object is two or more, obtain second progress information of the two or more first objects, where the second progress information indicates a spatial position of an object that was last output in the whole of the two or more first objects during outputting the two or more first objects in a first order.

The first order is an arrangement order of the two or more first objects in the display interface, and the arrangement order is the same as an arrangement order in which the two or more first objects were last displayed in the display interface.

Optionally, the interface display unit 501 may include a first interface display subunit.

The first interface display subunit is configured to display a display interface of a first application including at least one object, where a second application is started and a content of an object is output by performing a trigger operation on the object in the display interface of the first application, and the second application is different from the first application.

The progress information obtaining unit may further include a third progress information obtaining subunit.

The third progress information obtaining subunit is configured to, in a case that the number of the at least one first object is two or more, obtain third progress information of a second object that was last presented during outputting the two or more first objects in the first order, where the third progress information is progress information of the second object in a process that the second object was last output using the second application.

The third progress information indicates a spatial content position of the second object output that was last output using the second application in a whole content of the second object.

Alternatively, the third progress information indicates a time content position of the second object that was last output using the second application in a whole content of the second object.

Optionally, the interface display unit 501 may include a second interface display subunit.

The second interface display subunit is configured to display the display interface, where the display interface includes at least one object, and the object has at least identification information and the progress information.

The identification information of the at least one first object is displayed in a first mode, and the identification information indicates information of a name of the first object.

The progress information of the at least one first object is displayed in a second mode, and the second mode is different from the first mode.

Optionally, the electronic device may further include a type information obtaining unit and a first object determining unit.

The type information obtaining unit is configured to obtain type information of the at least one object before the progress information of at least one first object of the at least one object is obtained.

The first object determining unit is configured to, in a case that a type of the object indicated by the type information meets a preset condition, determine the object of the type as the first object.

The type of the object indicated by the type information meeting the preset condition indicates that an application for presenting an object of the type exists locally in the electronic device.

Finally, it should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

According to the described embodiments above, those skilled in the art can clearly know that the disclosure may be implemented by means of software in conjunction with a hardware platform, or implemented by only hardware, but in many cases the former is a better implementing way. Based on such understanding, all or part of technical solutions of the disclosure contributing to the conventional technology may be embodied as a software product. The software product may be stored in a storage medium such as a ROM/RAM, a magnetic disc or an optical disc, and include several instructions for controlling a computer device (which may be a personal computer, a server or a network device) to perform the method described in various embodiments of the disclosure or certain part of the embodiments.

Various embodiments in the specification are described in a progressive way, each embodiment lays emphasis on difference from other embodiments, and for the same or similar parts among various embodiments, one may refer to the description of other embodiments. The electronic device disclosed by the embodiments corresponds to the method disclosed by the embodiments, so the description of the electronic device is simple; and for the related parts, one may refer to the illustration of the method embodiments.

The principles and implementations of the disclosure are clarified using specific examples herein, and the illustration of the above embodiments is only to help to understand the method of the disclosure and its key concept. Those skilled in the art may make changes to the embodiments and its application scope based on the concept of the disclosure. In summary, the specification should not be understood as a limitation to the disclosure.

The invention claimed is:

1. A method for executing an object, the method applied to an electronic device comprising a processor, and the method comprising:
   obtaining, by the processor, a plurality of first objects arranged in a first order that were last displayed in a display interface, wherein the plurality of first objects each has a type that meets a preset condition, and the type of the object meeting the preset condition indicates that an application for presenting an object of the type exists locally;
   obtaining, by the processor, first progress information of the plurality of first objects, wherein the first progress information indicates a last executed object among of the plurality of first objects arranged in the first order;
   displaying, by the processor, the plurality of first objects arranged in the first order, with the last executed object being displayed with the first progress information, wherein the last executed object being displayed with the first progress information indicates the last executed object being displayed with a different color or being displayed with an added mark compared with other first objects; and
   executing, by the processor, the last executed object by performing a trigger operation based upon the first progress information.

2. The method according to claim 1, wherein the display interface is a display interface of a first application, and a second application is started and a content of an object is output by performing a trigger operation on the object in the display interface of the first application, and the second application is different from the first application; and
   wherein the method further comprises:
   obtaining second progress information of the last executed object, wherein the second progress information is progress information of the last executed object in a process that the last executed object was last output using the second application,
   wherein the second progress information indicates at least one of a spatial position or a time position of a content of the last executed object that was last output using the second application in a whole content of the last executed object; and
   displaying the second progress information of the last executed object in the display interface of the first application.

3. The method according to claim 2, wherein obtaining the second progress information of the last executed object comprises:
   obtaining the second progress information of the last executed object by a third application, and sending the second progress information from the third application to the first application, wherein the third application is different from the first application; or
   obtaining the second progress information of the last executed object directly by the first application.

4. An electronic device, comprising a processor and a non-transitory storage medium having a plurality of instructions stored thereon that, when executed by the processor, cause the processor to:
   obtain a plurality of first objects arranged in a first order that were last displayed in a display interface in a first order, wherein the plurality of first objects each has a type that meets a preset condition, and the type of the object meeting the preset condition indicates that an application for presenting an object of the type exists locally;
   obtain first progress information of the plurality of first objects, wherein the first progress information indicates a last executed object among the plurality of first objects arranged in the first order;
   display the plurality of first objects arranged in the first order, with the last executed object being displayed with the first progress information, wherein the last executed object being displayed with the first progress information indicates the last executed object being displayed with a different color or being displayed with an added mark compared with other first object; and
   execute the last executed object by performing a trigger operation based upon the first progress information.

5. The electronic device according to claim 4, wherein the display interface is a display interface of a first application, and
   a second application is started and a content of an object is output by performing a trigger operation on the object in the display interface of the first application, and the second application is different from the first application; and
   wherein the instructions, when executed by the processor, further cause the processor to: obtain second progress information of the last executed object, wherein the second progress information is progress information of the last executed object in a process that the last executed object was last output using the second application,
   wherein the second progress information indicates a spatial position of a content of the last executed object that was last output using the second application in a whole content of the last executed object; and
   display the second progress information of the last executed object in the display interface of the first application.

* * * * *